(12) United States Patent
Xu et al.

(10) Patent No.: US 9,036,477 B2
(45) Date of Patent: May 19, 2015

(54) VIRTUAL PRIVATE NETWORK TO LABEL SWITCHED PATH MAPPING

(71) Applicant: Verizon Patent and Licensing Inc., Basking Ridge, NJ (US)

(72) Inventors: Fengman Xu, Allen, TX (US); William F. Copeland, Garland, TX (US); Khalid M. Elshatali, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 158 days.

(21) Appl. No.: 13/709,526

(22) Filed: Dec. 10, 2012

(65) Prior Publication Data

US 2014/0160925 A1   Jun. 12, 2014

(51) Int. Cl.
*H04L 12/801* (2013.01)
*H04L 12/723* (2013.01)
*H04L 12/54* (2013.01)

(52) U.S. Cl.
CPC ............... *H04L 47/17* (2013.01); *H04L 45/50* (2013.01); *H04L 12/5689* (2013.01)

(58) Field of Classification Search
USPC .................. 370/395.53, 235, 237, 254–255
See application file for complete search history.

(56) References Cited

U.S. PATENT DOCUMENTS

| | | | |
|---|---|---|---|
| 8,259,564 B1* | 9/2012 | Gredler et al. ................. | 370/227 |
| 2006/0133265 A1* | 6/2006 | Lee ............................... | 370/228 |
| 2011/0075680 A1* | 3/2011 | Sun et al. ...................... | 370/419 |
| 2011/0103263 A1* | 5/2011 | Unbehagen et al. .......... | 370/254 |
| 2012/0275338 A1* | 11/2012 | Filsfils et al. ................. | 370/254 |
| 2013/0036192 A1* | 2/2013 | Fausak .......................... | 709/217 |
| 2013/0100953 A1* | 4/2013 | Li et al. ......................... | 370/390 |
| 2013/0315244 A1* | 11/2013 | Rabie et al. ................... | 370/392 |
| 2014/0146664 A1* | 5/2014 | Amante, Shane ............. | 370/228 |

* cited by examiner

*Primary Examiner* — Warner Wong

(57) ABSTRACT

A method, a device, and a storage medium provide for storing an extended forwarding information base that includes path values that indicate paths to route traffic, wherein the paths include optimal and sub-optimal paths based on a shortest path metric; receiving a traffic flow; inspecting the traffic flow; selecting a next hop and one of the path values associated with the next hop based on the inspecting; identifying one or more paths to route the traffic flow in accordance with one or more paths indicated by the one of the path values; and transmitting the traffic flow along the one or more paths toward a destination.

20 Claims, 12 Drawing Sheets

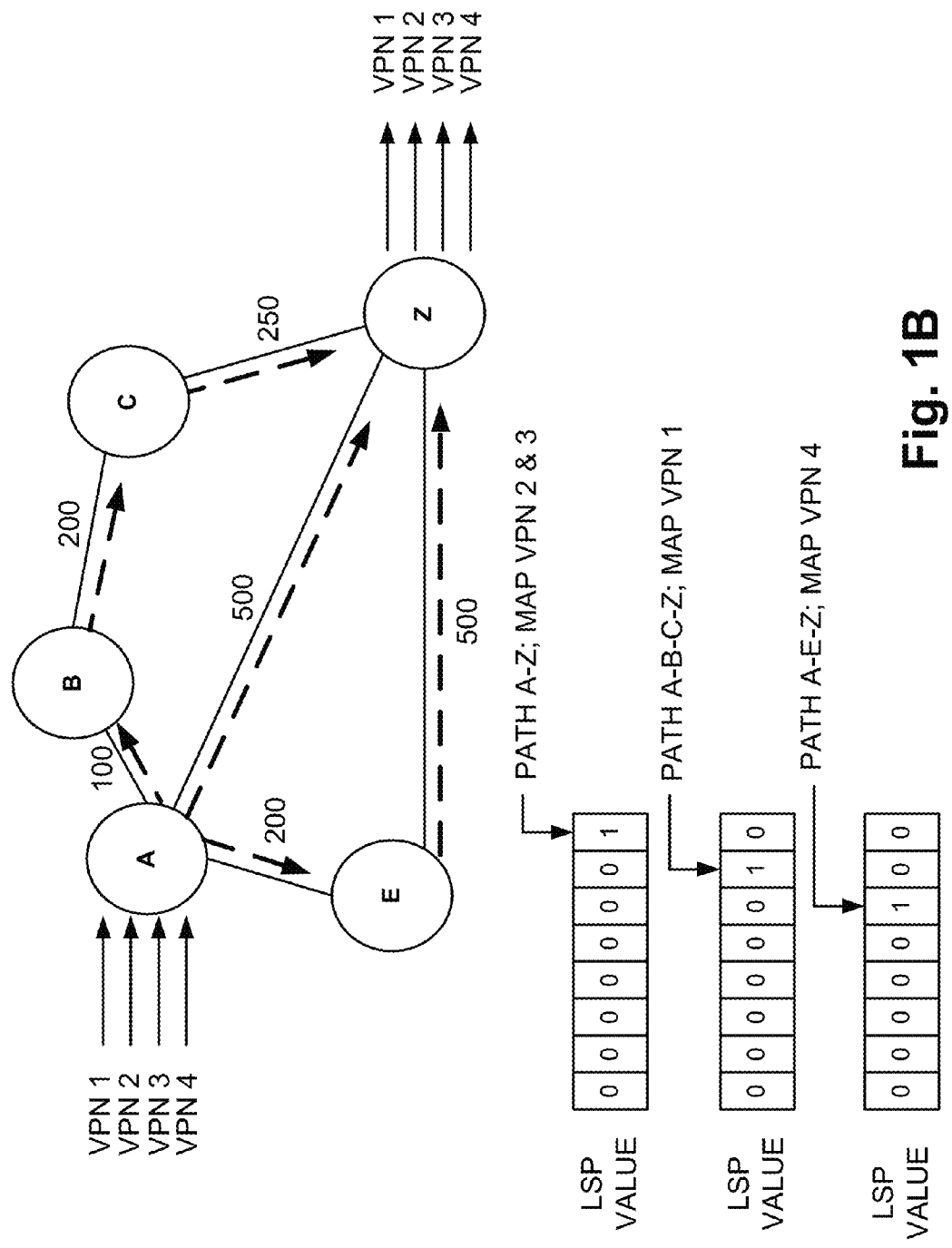

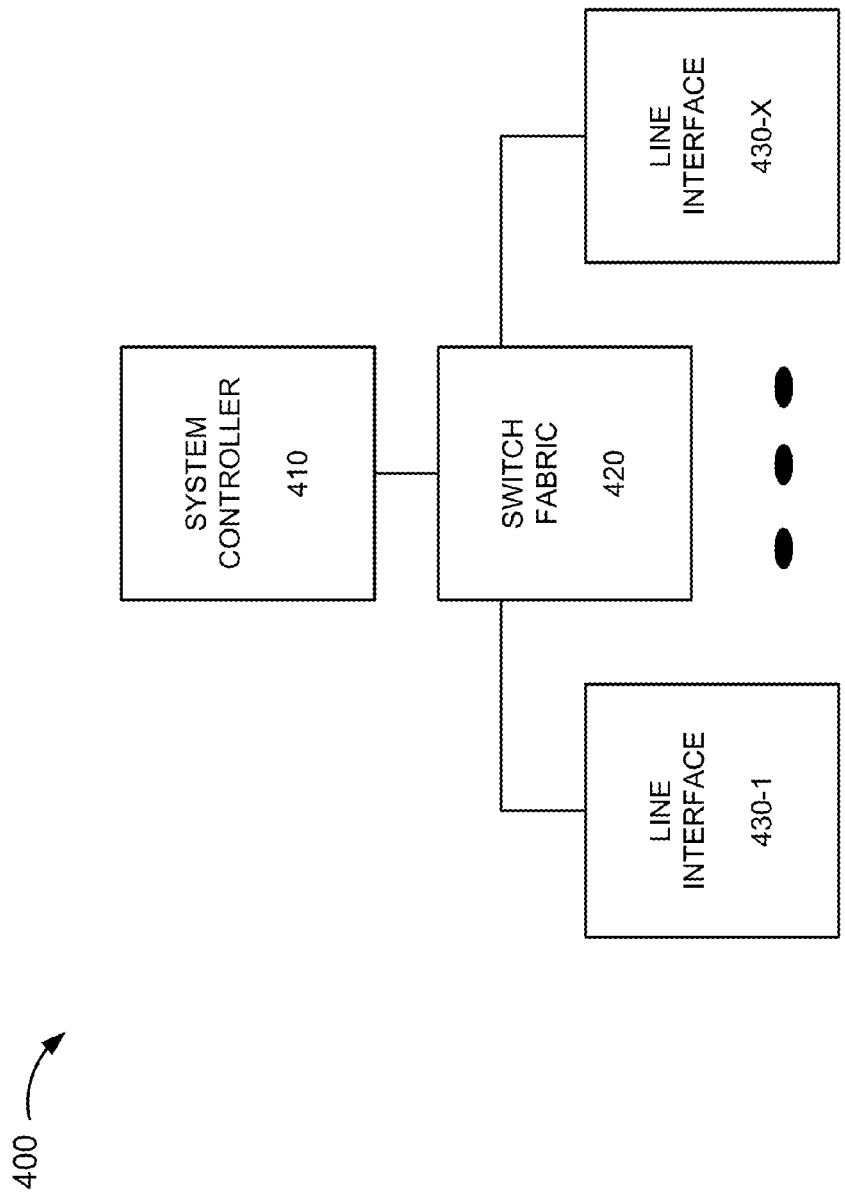

| E-LFIB 500 | | | | |
|---|---|---|---|---|
| DESTINATION ADDRESS | FORWARDING INFO | VPN LABEL | NETWORK LABEL | LSP BIT VALUE |
| 10.1.1.2 | NEXT HOP B | 10 | 30 | 1 |
| 10.1.1.3 | NEXT HOP C | 11 | 31 | 1 |
| 11.1.1.4 | NEXT HOP E | 12 | 32 | 1 |
| 10.15.1.1 | NEXT HOP B | 13 | 30 | 2 |
| 10.15.1.2 | NEXT HOP Z | 14 | 43 | 6 |
| 10.15.1.3 | NEXT HOP Z | 14 | 43 | 6 |
| 10.15.1.5 | NEXT HOP C | 16 | 31 | 4 |
| ... | ... | ... | ... | ... |
| ↑ 505 | ↑ 510 | ↑ 515 | ↑ 520 | ↑ 525 |

535-1 → (row 1), 535-2 → (row 4), 535-4 → (row 5), 535-3 → (row 7)

Fig. 5

VIRTUAL PRIVATE NETWORK TO LABEL SWITCHED PATH MAPPING

BACKGROUND

In Multiprotocol Label Switching (MPLS)-based networks, such as MPLS-based Virtual Private Networks (VPNs), various architectures may be implemented to provide traffic policing and routing at ingress and egress interfaces.

DESCRIPTION OF THE DRAWINGS

FIG. 1B is a diagram illustrating an exemplary scenario in which label switched path mapping based on a label switched path value may be implemented;

FIG. 4A is a diagram illustrating exemplary components of a network device that may correspond to one or more of the devices depicted in the previous figures;

FIG. 5 is a diagram illustrating an exemplary Extended Label Forwarding Information Base;

DETAILED DESCRIPTION

The following detailed description refers to the accompanying drawings. The same reference numbers in different drawings may identify the same or similar elements.

Figure 1A:
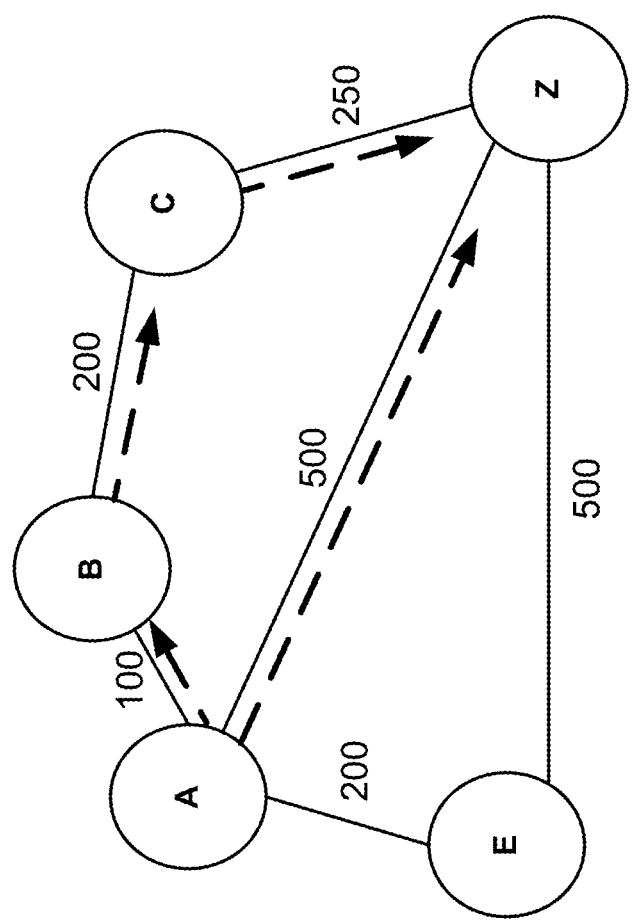
FIG. 1A is a diagram illustrating an exemplary scenario in which label switched path forwarding may be implemented.

Currently, in MPLS-based VPN networks, such as an MPLS Label Distribution Protocol (LDP)-based network, it is common practice for VPN traffic to be routed to the destination via the Label Switched Path (LSP) having the lowest Interior Gateway Protocol (IGP) metric, such as an Open Shortest Path First (OSPF) cost. When a route on which the VPN traffic flows gets busy, congestion may occur. In response to this condition, a common practice for rerouting the VPN traffic is to adjust the IGP metric. However, the effect of rerouting the VPN traffic by tweaking the IGP metric is very limited. For example, referring to FIG. 1A, assume that a majority of VPN traffic is between node A and node Z. Assume that the IGP metric between node A and node Z has a value of 500. Unfortunately, due to the majority of VPN traffic flowing between node A and node Z, congestion occurs. In response to this condition, the IGP metric is changed from a value of 500 to a value of at least 550. As a result, the VPN traffic flowing from node A to node Z would change to the LDP path of nodes A-B-C-Z since the LDP path has an IGP metric value of 550. The effect of the change-over amounts to an all-or-nothing proposition in which all of the VPN traffic migrates to the LDP path of nodes A-B-C-Z.

A label switched path or path, as described herein, may be a logical label switched path or a physical label switched path. For example, a label switched path may be a layer 3 path (e.g., Internet Protocol (IP), MPLS, Private Virtual Circuit (PVC), Pseudo wire (PW), etc.) between two nodes.

According to an exemplary embodiment, nodes (e.g., provider edge devices) in an MPLS-based network manage routing based on a liberal label retention mode. For example, a provider edge device (e.g., a label switching router (LSR)) stores all of the received labels in a Label Information Base (LIB). In this way, the provider edge device learns the topology of the MPLS-based network.

An MPLS Label Forwarding Information Base (LFIB) is derived from a Routing Information Base (RIB) and the LIB. Typically, the RIB has a primary or optimal routing path selected by an algorithm (e.g., OSPF, ISIS using Dijktra, etc.) and alternative or less than optimal paths are not used. The LIB has all the label information to map to the path. In contradistinction, according to an exemplary embodiment, nodes may use the primary routing path and/or the alternative paths for routing traffic.

According to an exemplary embodiment, a node includes an extended Label Forwarding Information Base. The extended Label Forwarding Information Base stores information that correlates a destination to an LSP value. The LSP value indicates one or multiple paths to route traffic from one PE to another. The one or multiple paths pertain to a primary path, one or multiple alternate paths, or some combination thereof. According to an exemplary embodiment, the LSP value provides a VPN-to-LSP mapping. The VPN-to-LSP mapping includes an ordering of paths from best path to worst path. According to an exemplary implementation, the ordering is based on an IGP metric (e.g., shortest path). According to an exemplary implementation, the LSP value may be represented in byte form.

FIG. 1B is a diagram illustrating an exemplary scenario in which label switched path mapping based on the LSP value is used. Referring to FIG. 1B, assume that source VPNs 1-4 route traffic via node A to reach destination VPNs 1-4 via node Z. According to an exemplary implementation, node A routes traffic to destination VPNs based on the LSP value included in the extended Label Forwarding Information Base. For example, the LSP value one (1) causes node A to route traffic destined to VPNs 2 and 3 via path A-Z, the LSP value two (2) causes node A to route traffic destined to VPN 1 via path A-B-C-Z, and the LSP value four (4) causes node A to route traffic destined to VPN 4 via path A-E-Z. In view of the IGP metrics illustrated in FIG. 1B, path A-Z corresponds to an optimal path (e.g., cost 500) from node A to node Z, path A-B-C-Z corresponds to a next optimal path (e.g., cost 550), and path A-E-Z to an even lesser optimal path (e.g., cost 700).

Figure 1C:
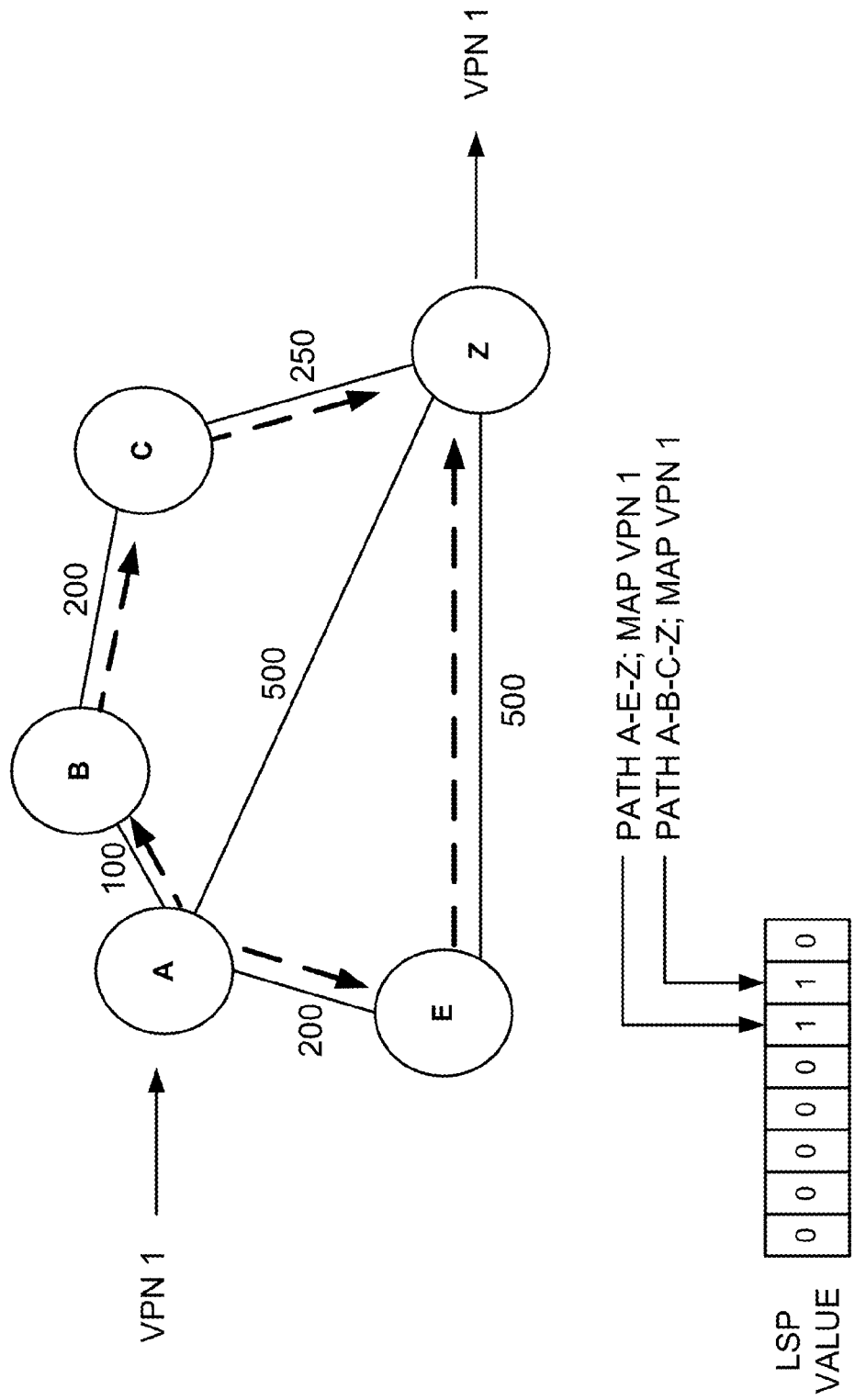
FIG. 1C is a diagram illustrating another exemplary scenario in which label switched path mapping based on a label switched path value may be implemented.

FIG. 1C is a diagram illustrating another exemplary scenario in which label switched path mapping based on the LSP value is used. Referring to FIG. 1C, in this case, the LSP value six (6) causes node A to route traffic destined to VPN 1 via both paths A-B-C-Z and A-E-Z.

According to an exemplary implementation, as previously described, the LSP values are represented in byte form. According to this format, LSP values 1, 2, 4, 8, 16, 32, and 64 are values indicative of best to worst paths from one PE to another. That is, an LSP value of one (1) indicates the best path, an LSP value of two (2) indicates the second best path, an LSP value of four (4) indicates the third best path, an LSP value of eight (8) indicates a fourth best path, and so on and so forth. These LSP values also indicate a single path, such as those illustrated and described in relation to FIG. 1B. Additionally, according to an exemplary implementation, particular LSP values indicate multiple paths, which may include a primary path and one or multiple alternate paths, or multiple alternate paths. For example, an LSP value of 3 indicates the primary path and the second best path, an LSP value of 5 indicates the primary path and the third best path, and an LSP value of 6 indicates the second best path and the third best path, and so on and so forth. In this way, a value of one (1) in any of the bit positions indicates a path.

According to an exemplary embodiment, a node uses a conventional Label Forwarding Information Base in which traffic is routed via the primary or optimal path and uses the extended Label Forwarding Information Base in response to a network condition (e.g., congestion). According to another exemplary embodiment, a node uses the extended Label Forwarding Information Base all of the time. In contrast to altering the IGP metric or adding targeted LDP pseudo wires (T-LDP PW), the routing of traffic is not limited to an all-or-nothing approach.

While implementations of exemplary embodiments described herein are described using a particular protocol, communication standard, platform, etc., such implementations are not intended to be restrictive or provide an exhaustive treatment, as such. In other words, the embodiments described herein may be implemented using other suitable protocols, communication standards, platforms, etc., which may not be specifically described. For example, one or more embodiments described herein may be practiced in a Provider Backbone Bridge Traffic Engineering (PBB-TE)-based network, a Generalized MPLS (GMPLS)-based network, or a Q-in-Q-based network. For example, other MPLS-equivalent labels, such as a generalized label associated with the GMPLS network, a virtual local area network (VLAN) tag associated with the Q-in-Q-based network, or a media access control (MAC) address associated with the PBB network may be used. By way of further example, the generalized label can represent a single fiber in a bundle, a single waveband within a fiber, a single wavelength within a waveband or a fiber, or a set of time-slots within a wavelength or a fiber. The generalized label may also carry a label that represents a generic MPLS label, a Frame Relay label, or an Asynchronous Transfer Mode (ATM) label. Additionally, while embodiments are described in relation to an IGP metric other metrics may be used.

Figure 2:
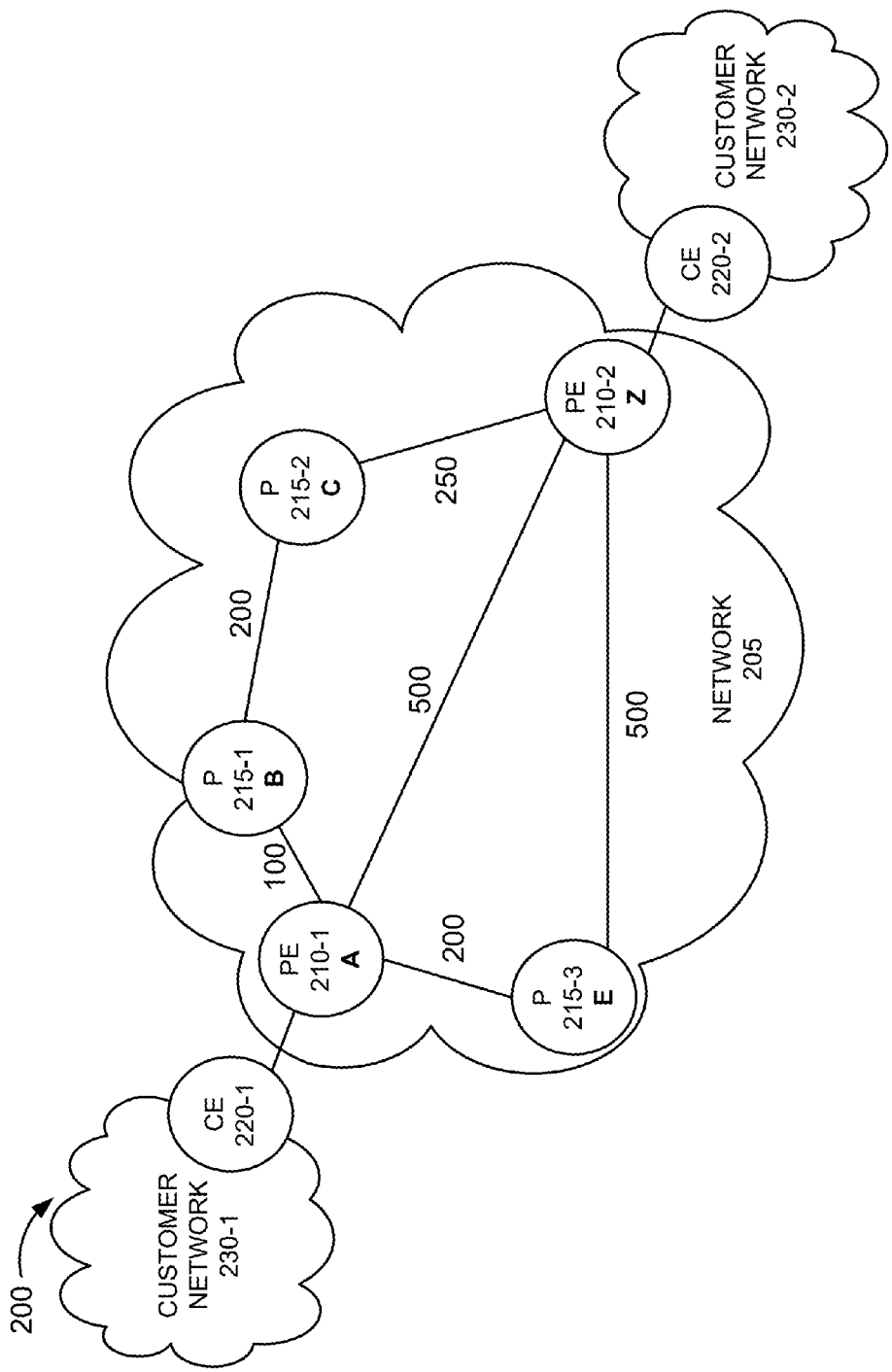
FIG. 2 is a diagram illustrating an exemplary environment in which an exemplary embodiment of an MPLS-based network with label switched path mapping based on label switched path values may be implemented.

FIG. 2 is a diagram illustrating an exemplary environment in which an exemplary embodiment of an MPLS-based network with label switched path mapping based on LSP values may be implemented. As illustrated, environment 200 includes a network 205 that includes provider edge (PE) devices 210-1 and 210-2 (also referred to collectively as provider edge devices 210 and individually as provider edge device 210) and provider (P) devices 215-1 through 215-3 (also referred to collectively as provider devices 215 and individually as provider device 215). Additionally, environment 200 includes customer edge (CE) devices 220-1 and 220-2 (also referred to collectively as customer edge devices 220 and customer edge device 220) and customer networks 230-1 and 230-2 (also referred to collectively as customer networks 230 and individually as customer network 230).

The number of devices and the configuration of devices and networks in environment 200 are exemplary and provided for simplicity. According to other embodiments, environment 200 may include additional devices, fewer devices, different devices, and/or differently arranged devices, than those illustrated in FIG. 2.

Environment 200 may be implemented to include wired and/or wireless connections among the devices and the networks illustrated. A connection may be direct or indirect and may involve intermediary device(s) not illustrated in FIG. 2. Additionally, the number and the arrangement of connections between the devices and the networks are exemplary and provided for simplicity.

Network 205 includes an MPLS network that provides, for example, pseudo wire (PW) services, virtual private local area network (VLAN) services, layer 2 MPLS virtual private network (VPN) services, and/or layer 3 MPLS VPN services. Network 205 may be capable of providing traffic mapping to provider edge devices 210, an individual VPN, a group of VPNs, and/or a label switched path.

According to an exemplary implementation, network 205 includes label switched paths. For example, network 205 includes LDP label switched paths that do not have traffic engineering capabilities. According to another exemplary implementation, network 205 includes label switched paths that have traffic-engineering capabilities. For example, network 205 includes Resource Reservation Protocol (RSVP) or RSVP-Traffic Extension (RSVP-TE) label switched paths that support explicit paths and bandwidth reservation. According to yet another exemplary implementation, network 205 includes stacked label switched paths. For example, network 205 may include an LDP LSP that is stacked over an RSVP LSP or an RSVP-TE LSP. A session on a label switched path may be established among provider edge device(s) 210 and/or provider device(s) 215 that support the LDP and the use of tunneling via RSVP LSP(s) or RSVP-TE LSP(s).

Provider edge device 210 includes a network device that receives and transmits a traffic flow. Provider edge device 210 routes traffic based on labels included in traffic and label switched path mappings, as described herein. According to an exemplary implementation, provider edge device 210 includes a router that routes traffic flows to and from customer network 230 via customer edge device 220 and routes traffic flows to and from provider devices 210. According to an exemplary implementation, provider edge device 210 performs labeling.

Provider device 215 includes a network device that receives and transmits a traffic flow. According to an exemplary implementation, provider device 215 is a core or a backbone router in network 205.

Customer network 230 includes a network associated with a customer site. Customer edge device 220 includes a network device that receives and transmits a traffic flow to/from network 205. According to an exemplary implementation, customer edge device 220 includes a router that routes traffic flows to and from network 205 via provider edge device 210. According to an exemplary implementation, customer edge device 220 includes a layer 2 and a layer 3 service-aware device.

Figure 3:
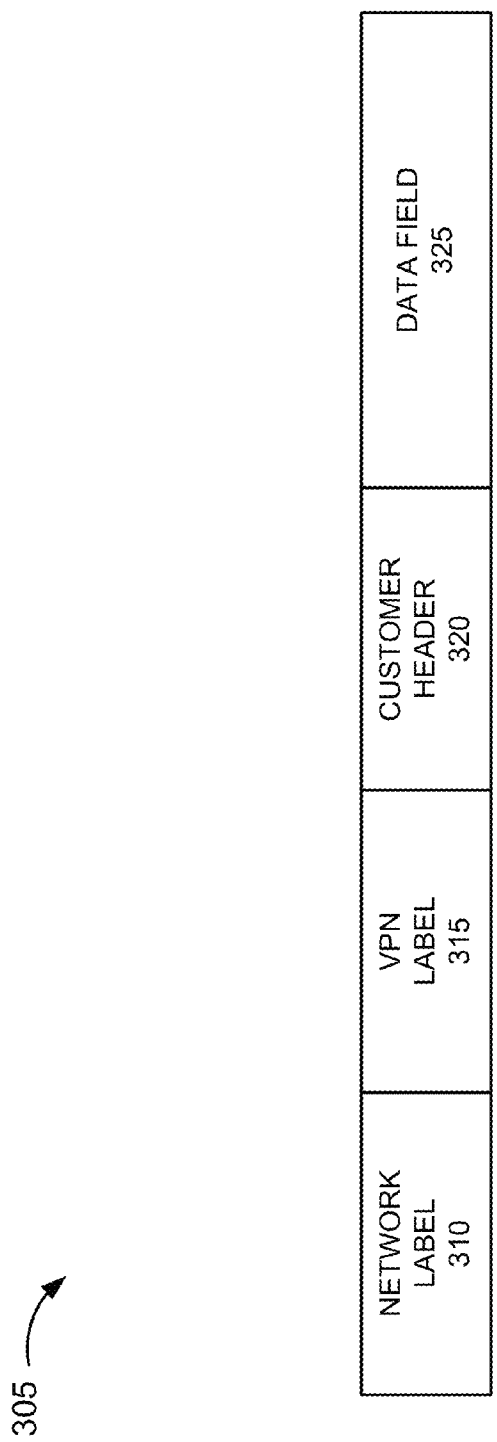
FIG. 3 is a diagram illustrating an exemplary packet format.

The term "packet," as used herein, is intended to be broadly interpreted to include a data transmission or communication, the packaging of which may correspond to, for example, a packet, a cell, a frame, a datagram, some other type of container or unit of data, and/or a fragment thereof. The packet may include or be modified to include a label or other suitable field(s) to comply with the communication standard associated with network 205 (e.g., an MPLS network). For example, referring to FIG. 3, a packet 305 may include a network label 310, a virtual private network (VPN) label 315, a customer header 320, and a data field 325. According to other implementations, packet 305 may include additional, fewer, and/or different field(s), label(s), or section(s).

Network label 310 includes an MPLS label (e.g., sometimes referred to as an outer label). For example, network label 310 may identify the segment(s) of a label switched path between an ingress provider edge device 210 and an egress provider edge device 210. Virtual private network label 315 includes a label to distinguish between VPNs (e.g., sometimes referred to as an inner label). For example, virtual private network label 315 may include forwarding information (e.g., an egress provider edge device's outgoing interface for the packet, a virtual circuit identifier, a quality of service value(s), etc.). Additionally, or alternatively, virtual private network label 315 may include, for example, an identifier (e.g., a string) that identifies a customer's VPN. Customer header 320 includes source and destination addresses (e.g., IP addresses), and data field 325 includes data.

Figure 4B:
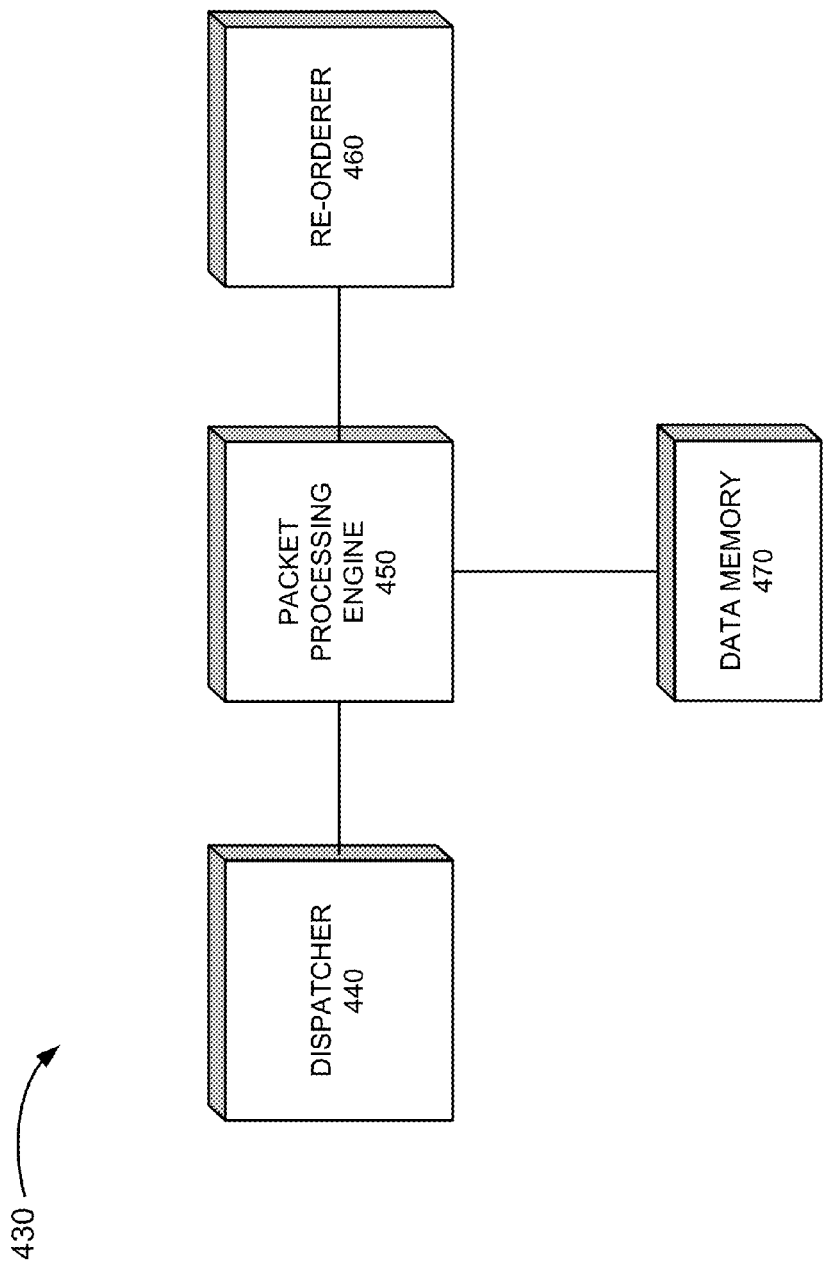
FIG. 4B is a diagram illustrating exemplary functional components of a line interface of the network device depicted in FIG. 4A.

FIG. 4A is a diagram illustrating exemplary components of a network device 400 that may correspond to one or more of the devices in the previous figures. For example, provider edge devices 210 and provider devices 215 may be implemented according to the components illustrated and described in FIGS. 4A and 4B. Referring to FIG. 4A, as illustrated, network device 400 includes a system controller 410, a switch fabric 420, and line interfaces 430-1 through 430-X, in which X>1 (also referred to collectively as line interfaces 430 or individually as line interface 430). According to other embodiments, device 400 may include fewer components, additional components, different components, and/or a different arrangement of components than those illustrated in FIG. 4A and described herein.

System controller 410 includes one or multiple processors, microprocessors, application specific integrated circuits (ASICs), field programming gate arrays (FPGAs), and/or processing logic that may be optimized for networking and communications. System controller 410 may also include one or multiple static memories (e.g. read only memory (ROM)), one or multiple dynamic memories (e.g. random access memory (RAM)), one or multiple onboard caches and/or flash memories for storing data and/or machine-readable instructions.

System controller 410 may perform high level management functions for network device 400. For example, system controller 410 may communicate with other networks, devices, and/or systems connected to network device 400 to exchange information regarding network topology. System controller 410 may also include a routing engine.

Switch fabric 420 include one or multiple switching planes to facilitate communication among line interfaces 430 and/or system controller 410. According to an exemplary implementation, a switching plane includes a single-stage switch or a multi-stage switch of crossbar elements. Switch fabric 420 may also, or alternatively, include one or more processors, one or more memories, and/or one or more paths that permit communication among system controller 410 and line interfaces 430.

Line interfaces 430 include devices or components, such as, for example, line cards, for receiving incoming packets from network links (or from other line interfaces 430) and for transmitting packets to network links (or to other line interfaces 430). Line interfaces 430 manage a set of input ports via which packets may be received and a set of output ports via which packets may be transmitted. Line interfaces 430 may include one or more processors, one or more memories, and/or other forms of logic and/or hardware.

According to an exemplary embodiment, network device 400 performs label switched path mapping based on an LSP value to route and/or switch traffic flows, as described herein. According to an exemplary implementation, network device 400 performs one or more operations of a process in response to system controller 410 and/or line interface(s) 430 executing instructions (e.g., software, microinstructions, etc.). Alternatively, according to another exemplary implementation, network device 400 performs one or more operations of a process based on hardware processing.

FIG. 4B is a diagram illustrating exemplary functional components of line interface 430 depicted in FIG. 4A. The functional components illustrated in FIG. 4B may be implemented by hardware (e.g., one or more processors or other processing logic) or a combination of hardware and software. As illustrated, line interface 430 may include a dispatcher 440, a packet processing engine (PPE) 450, a re-orderer 460, and a data memory 470.

Dispatcher 440 may serve packets to packet processing engine 450. Dispatcher 440 may store the packets in a memory associated with packet processing engine 450. Dispatcher 440 may receive an indication (e.g., a signal) from re-orderer 460 that packets have been processed by packet processing engine 450. Dispatcher 440 may re-utilize resources for other incoming packets based on this indication.

Packet processing engine 450 may provide for input processing, route lookup, and output processing of packets. Packet processing engine 450 may use data memory 470 to perform routing lookups, classification of packets (e.g., for security purposes), policy-based routing, quality of service (QoS) routing, filtering of packets, and other forms of packet processing (e.g., packet statistical processing, accounting, and/or encapsulation). Packet processing engine 450 may perform one or more packet processing operations (e.g., packet parsing, route lookup, packet rewriting, and/or firewall determinations, etc.) based on microinstructions. The microinstructions may be generated by compiling source code for an application or part of an operating system (OS), such as, for example, Juniper Operating System (JUNOS), Cisco Internet Operating System (IOS), etc. Packet processing engine 450 may execute the microinstructions in one or more processes or threads.

According to an exemplary embodiment, device 400 includes a load-balancer. For example, when the LSP value allows for the selection between multiple paths, device 400 may load-balance packets between the multiple paths indicated by the LSP value. By way of example, an LSP value of six (6) indicates two paths. The two paths are the second best optimum path and the third best optimum path. According to an exemplary implementation, load-balancing functionality may be included in packet processing engine 450.

Re-orderer 460 may retrieve packets from a memory associated with packet processing engine 450 when packet processing engine 450 processes are completed. Re-orderer 460 may manage the ordering of the packets when the packets are associated with a same traffic flow. Re-orderer 460 may pass the packets for output by network device 400.

Data memory 470 may store various types of data related to packet processing. For example, data memory 470 may store an extended label forwarding information base (E-LFIB), a label forwarding information base (LFIB), routing policies, etc. Data memory 470 may be implemented as, for example, a cache memory or other type of high-speed access memory or non-transitory storage medium.

Although FIG. 4B illustrates exemplary functional components of an exemplary line interface 430, according to other implementations, line interface 430 may include fewer functional components, additional functional components, and/or different functional components than those depicted in FIG. 4B and described herein. Additionally, or alternatively, one or more functional components of line interface 430 may perform one or more other tasks described as being performed by one or more other functional components of line interface 430. Additionally, dispatcher 440, packet processing engine 450, re-orderer 460, and/or data memory 470 may be implemented in a component other than line interface 430.

FIG. 5 is a diagram illustrating an exemplary E-LFIB 500. As illustrated in a column fashion, LFIB 500 includes a destination address field 505, a forwarding field 510, a VPN label field 515, a network label field 520, and an LSP bit value field 525. According to other implementations, extended LFIB 500 may include additional fields, different fields, and/or fewer fields than those illustrated in FIG. 5. Extended LFIB 500 may be implemented as a database or other suitable data structure stored in data memory 470. The data included in extended LFIB 500 is exemplary.

Destination field 505 includes information indicating a destination address. For example, the destination address may include an Internet Protocol (IP) address. Forwarding field 510 includes information indicating a next hop. For example, the next hop may be based on the Internal Border Gateway Protocol (IBGP). VPN label field 515 includes information indicating a VPN identifier. Network label field 520 includes information indicating a network identifier. LSP bit value field 525 includes information indicating an LSP value. As previously described, according to an exemplary implementation, the LSP value is represented in a byte format that indicates one or multiple paths and the one or multiple paths may correspond to an optimum path, an alternate path, or a combination thereof. For example, referring to entry 535-1, the LSP bit value field 525 indicates an LSP value of one (1), which represents a single path and that single path is an optimum path. According to an exemplary implementation, the metric for measuring the optimum path is shortest path. Referring to entries 535-2 and 535-3, for example, the LSP values of two (2) and four (4) each represent a single path in which the LSP value of two represents the second best optimum path and the LSP value of four represents the third best optimum path. Further, for example, referring to entry 535-4, the LSP value of six (6) represents two paths. The two paths are the second best optimum path and the third best optimum path.

As previously described, in MPLS-based VPN networks, such as an MPLS Label Distribution Protocol (LDP)-based network, it is common practice for VPN traffic to be routed to the destination via the LSP having the lowest IGP metric, such as shortest path cost. Typically, there is only one shortest path from a source to a destination. Thus, in some cases, a shortest path may exhibit congestion or some other adverse condition. As a result, packets may be dropped until the congestion or other condition abates or no longer exists. As previously described, it is a common practice, however, for network operators to tweak the IGP metric so as to migrate future traffic to another path. Unfortunately, this approach amounts to an all-or-nothing proposition.

There may be cases that an MPLS-based VPN network includes multiple equal-cost paths from a source to a destination. In such cases, equal-cost multipath routing (ECMP) has been proposed to allow load balancing over multiple paths of equal cost. However, in most cases, there is only one shortest path. Thus, according to such cases and in contradistinction to existing approaches, network operators may use path mappings based on the LSP values, as described herein. An LSP value may indicate a single path or multiple paths having different costs.

Figure 6A:
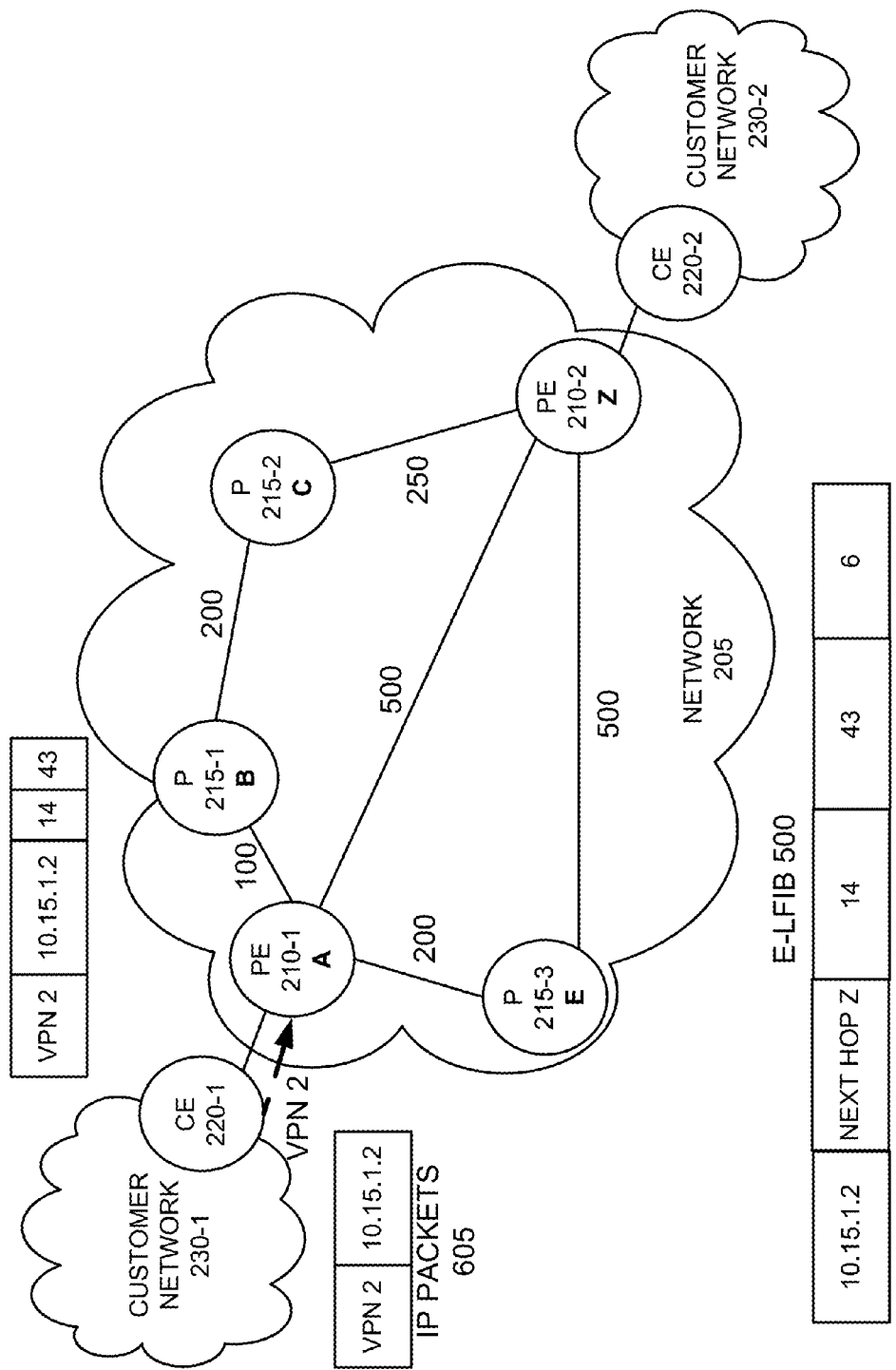
FIGS. 6A and 6B are diagrams illustrating an exemplary process pertaining to label switched path mapping based on label switched path values.
Figure 6B:
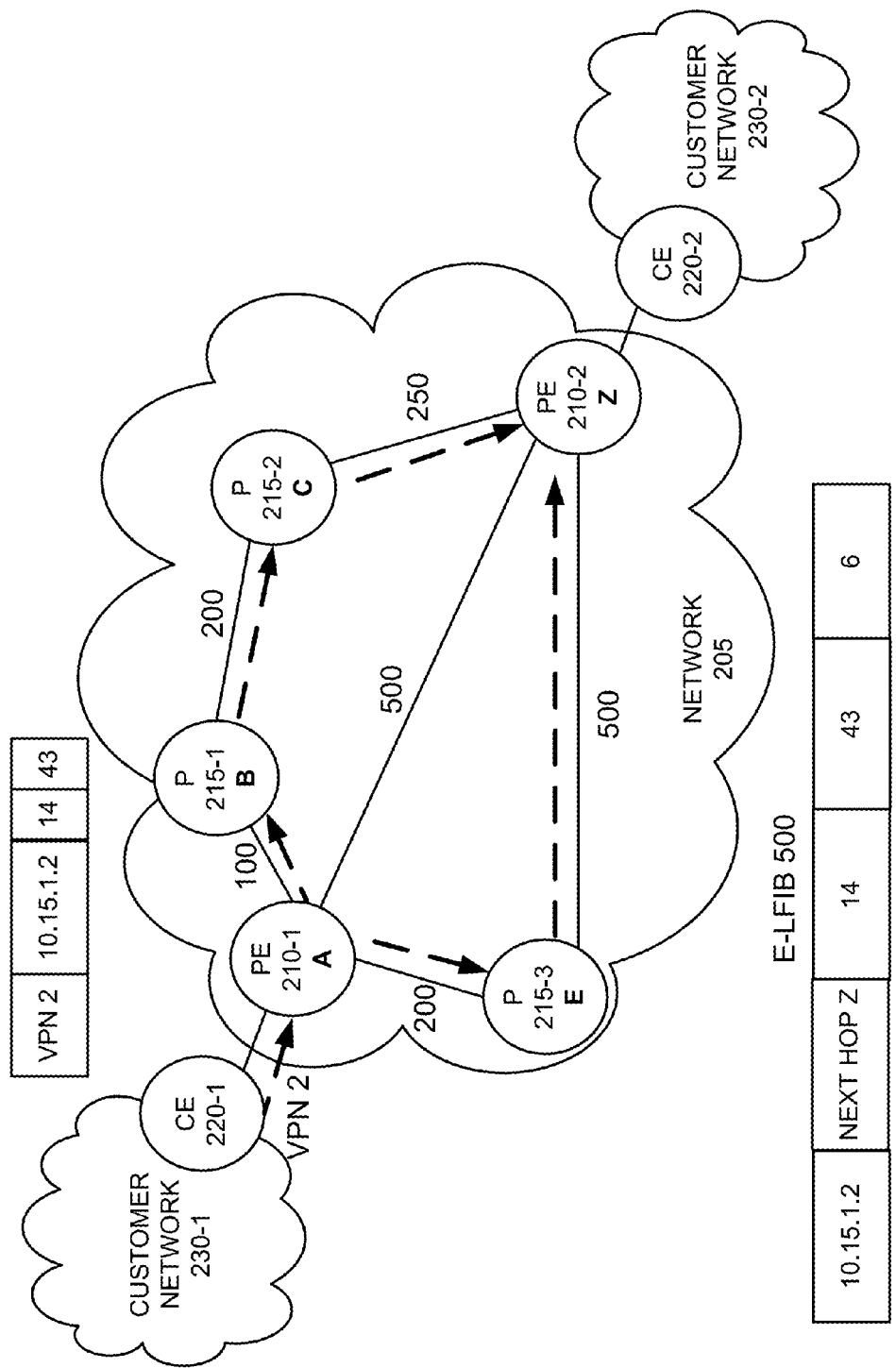

FIGS. 6A and 6B are diagrams that illustrate an exemplary process pertaining to label switched path mapping based on LSP values. According to this exemplary process, assume that PEs 210 use the extended label forwarding information base all of the time (e.g., a proactive approach).

Referring to FIG. 6A, assume that PE 210-1 receives traffic from customer network 230-1. The traffic includes IP packets 605 that indicate a source VPN (e.g., VPN 2) and a destination address (e.g., 10.15.1.2). PE 210-1 consults E-LFIB 500 and identifies an entry for the destination address. In this example, entry in E-LFIB 500 indicates that the destination address correlates or maps to a Border Gate Protocol (BGP) next hop node Z, a VPN label of 14, a network label of 43, and an LSP value of 6. As illustrated, PE 210-1 adds to the IP packets 605, for example, a VPN label and a network label based on the E-LFIB entry.

Referring to FIG. 6B, PE 210-1 selects the paths to route the traffic to the next hop (e.g., node Z) according to the LSP value of 6. In this case, the LSP value 6 represents paths A-E-Z and A-B-C-Z (i.e., the second and the third best optimum paths based on path metric values). PE 210-1 load balances the traffic along the two sub-optimal paths depending on the hashing function used by the equipment vendor. For example, PE 210-1 may transmit half of the traffic along path A-E-Z and the other half of the traffic along A-B-C-Z. According to other implementations, PE 210-1 may load balance the traffic along the two paths based on other well-known load balancing methodologies and/or the metric values associated with each path. By way of example, the load balancing performed may be configured such that a proportion of the traffic is balanced based on how optimum (or not optimum) the path is relative to other path(s) indicated by the LSP value. By way of further example, according to this exemplary scenario, the second best optimum path may carry a greater portion of the traffic than the third best optimum path. The greater portion may be calculated based on the disparity between the paths.

According to other exemplary processes, PEs 210 may use the extended label forwarding information base only when a condition exists (e.g., congestion). This may be considered a reactive approach. According to an exemplary embodiment, PEs 210 may store both an LFIB that provide shortest path routing, as is well-known, and an extended LFIB. PEs 210 may use the extended LFIB when, for example, congestion is detected (e.g., by PEs 210). PEs 210 may revert back to the LFIB when the congestion abates or no longer exists.

Figure 7:
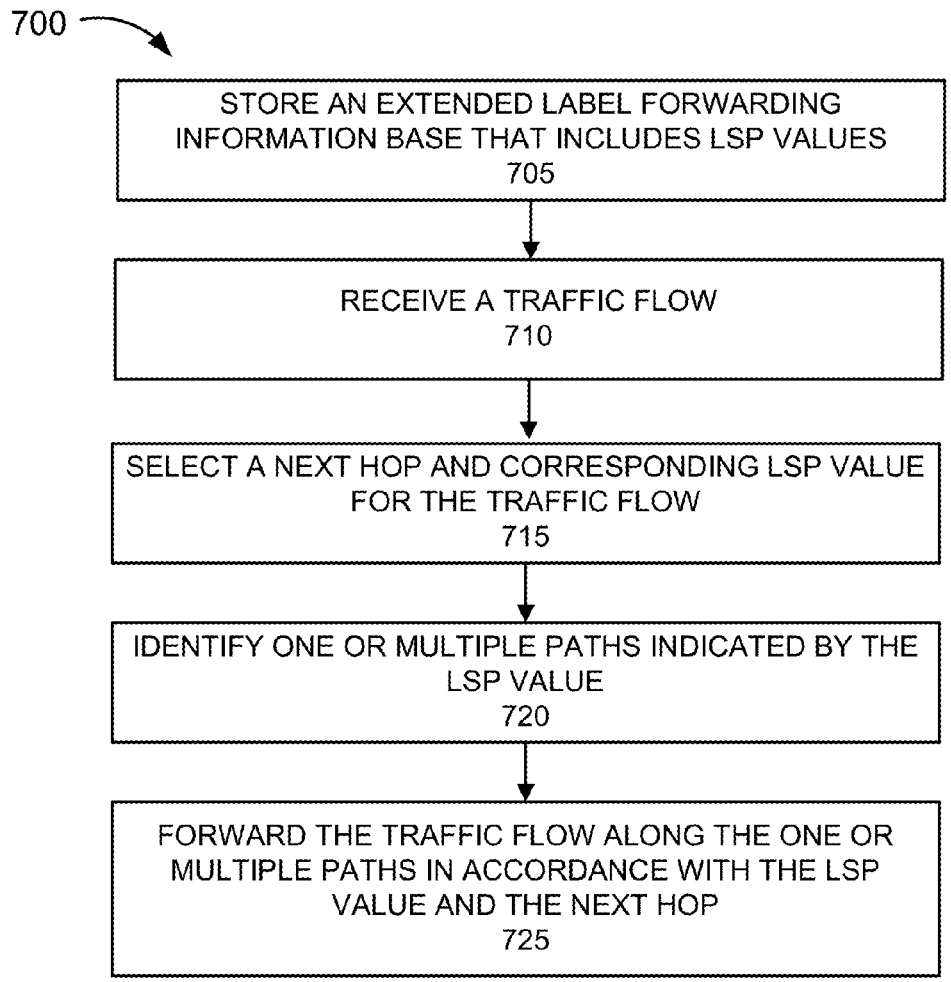
FIG. 7 is a flow diagram illustrating an exemplary process pertaining to an exemplary embodiment of label switched path mapping based on label switched path values.

FIG. 7 is a flow diagram illustrating an exemplary process pertaining to an exemplary embodiment of label switched path mapping based on LSP values. According to an exemplary embodiment, provider edge device 210 performs process 700. For example, system controller 410 and/or line interface 430 of provider edge device 210 executes one or more of the steps described. Process 700 may be considered a proactive approach in which the E-LFIB may be used all of the time, as previously described.

In block 705, an E-LFIB that includes LSP values is stored. For example, provider edge device 210 stores an E-LFIB 500 in data memory 470. The E-LFIB includes LSP values, as previously described.

In block 710, a traffic flow is received. For example, provider edge device 210 receives a traffic flow that includes packets.

In block 715, a next hop and corresponding LSP value is selected for the traffic flow. For example, provider edge device 210 uses the E-LFIB to select a next hop and LSP value for the traffic flow.

In block 720, one or multiple paths indicated by the LSP value are identified. For example, provider edge device 210 interprets the LSP value to identify the one or multiple paths represented by the LSP value.

In block 725, the traffic flow is forwarded along the one or multiple paths in accordance with the LSP value and the next hop. For example, provider edge device 210 forwards the traffic to the next hop along the one or multiple paths in accordance with the LSP value the next hop.

Although FIG. 7 illustrates an exemplary process 700 pertaining to label switched path mapping based on LSP values, according to other embodiments, process 700 may include additional operations, fewer operations, and/or different operations than those illustrated in FIG. 7 and described herein.

Figure 8:
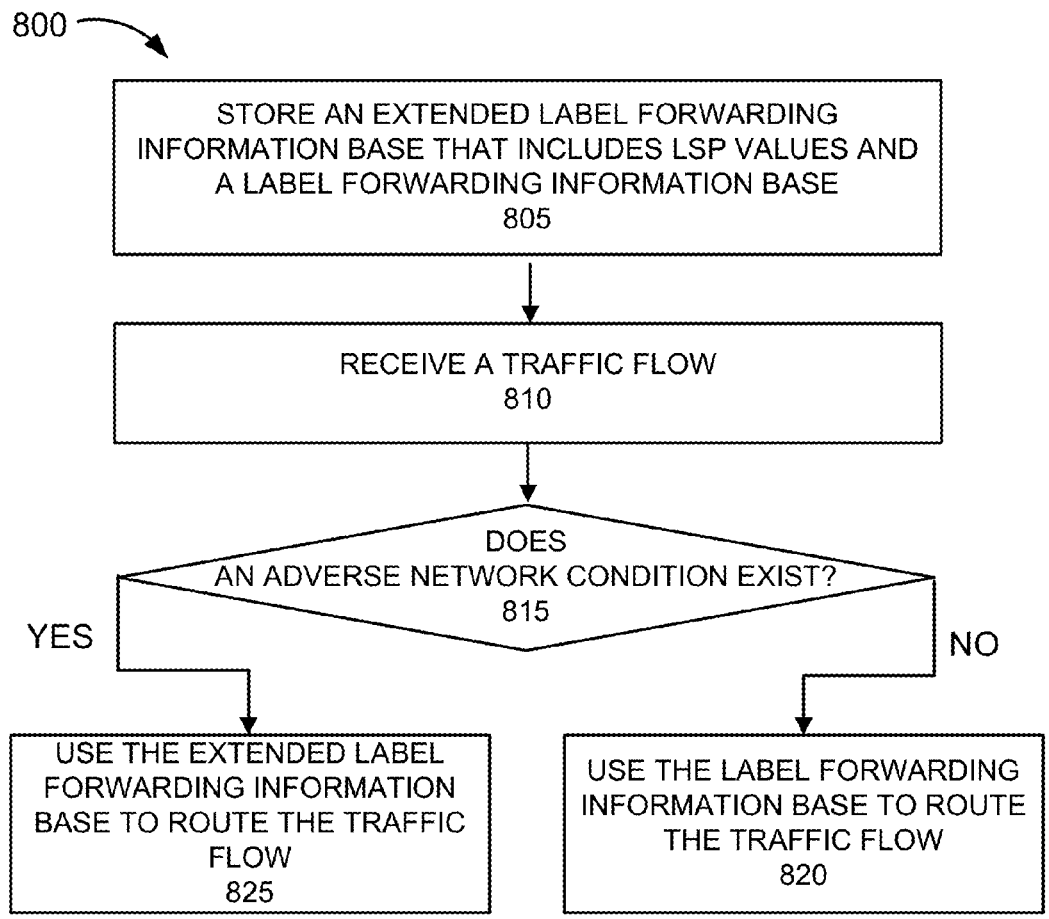
FIG. 8 is a flow diagram illustrating another exemplary process pertaining to an exemplary embodiment of label switched path mapping based on label switched path values.

FIG. 8 is a flow diagram illustrating another exemplary process pertaining to an exemplary embodiment of label switched path mapping based on LSP values. According to an exemplary embodiment, provider edge device 210 performs process 800. For example, system controller 410 and/or line interface 430 of provider edge device 210 executes one or more of the steps described. Process 800 may be considered a reactive approach in which the E-LFIB may be used dynamically and in real-time, in response to detection of congestion or other adverse network condition, as previously described.

In block 805, an E-LFIB that includes LSP values and an LFIB is stored. For example, provider edge device 210 stores an E-LFIB and an LFIB in data memory 470. The E-LFIB includes LSP values, as previously described. The LFIB may correspond to well-known LFIB architectures used for determining a next hop for routing/forwarding traffic.

In block 810, a traffic flow is received. For example, provider edge device 210 receives a traffic flow that includes packets.

In block 815, it is determined whether an adverse network condition exists. For example, provider edge device 815 determines or some other device informs provider edge device 210 that congestion exists along one or more label switched paths. A determination of whether congestion or other adverse condition exists may be identified based on well-known techniques (e.g., explicit congestion notification (ECN), etc.).

If it is determined that an adverse condition does not exist (block 815—NO), then the LFIB is used to forward the traffic flow. For example, provider edge device 210 uses the LFIB to select the next hop and forward the traffic flow along a label switched path. If it is determined that an adverse condition exists (block 815—YES), then the E-LFIB is used to forward the traffic. For example, provider edge device 210 uses the E-LFIB to select the next hop and forward the traffic flow along one or multiple label switched paths in accordance with the LSP value. For example, provider edge device 210 may perform steps 715, 720, and 725 of process 700 to forward traffic along one or multiple label switched paths.

Although FIG. 8 illustrates an exemplary process 800 pertaining to label switched path mapping based on LSP values, according to other embodiments, process 800 may include additional operations, fewer operations, and/or different operations than those illustrated in FIG. 8 and described herein.

To avoid micro-looping, embodiments may be configured by offline modeling tools or other well-known methods, such as Loop-Free Alternatives.

The foregoing description of embodiments provides illustration, but is not intended to be exhaustive or to limit the embodiments to the precise form disclosed. Accordingly, modifications to the embodiments described herein may be possible. By way of example, one or more of the processes described herein may be implemented by provider devices 215. Additionally, as previously described, an embodiment may be implemented in a network other than an MPLS-based network, such as, a PBB-TE-based network, a GMPLS-based network, or a Q-in-Q-based network. Additionally, label switched path mapping based on LSP values may be applied to RSVP where one LSP hop or multi-LSP hop to BGP next hop are assigned different values.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks is described with regard to the processes illustrated in FIGS. 7 and 8, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware or a combination of hardware and software. The embodiments have been described without reference to the specific software code since software can be designed to implement the embodiments based on the description herein.

Additionally, an embodiment described herein may be implemented as a non-transitory storage medium that stores data and/or information, such as instructions, program code, data structures, program modules, an application, etc.

In the preceding specification, various embodiments have been described with reference to the accompanying drawings. Various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
storing, by a network device, an extended label forwarding information base that includes a label forwarding information base and label switched path values, wherein the label forwarding information base indicates paths to which traffic can be routed towards destinations, wherein the paths include optimal and sub-optimal paths based on a shortest path metric, and each of the label switched path values indicates a selection of one or more paths included in the label forwarding information base, which are mapped to each of the label switch path values, to route the traffic;

receiving, by the network device, a traffic flow;

inspecting, by the network device, the traffic flow;

selecting, by the network device, a next hop and one of the label switched path values associated with the next hop based on the inspecting;

identifying, by the network device, one or more paths to route the traffic flow in accordance with one or more paths indicated by the one of the label switched path values; and transmitting, by the network device, the traffic flow along the one or more paths toward a destination.

2. The method of claim 1, wherein the one of the label switched path values indicates at least one sub-optimal path.

3. The method of claim 1, wherein the one of the label switched path values indicates multiple paths including at least one sub-optimal path, and the method further comprising:

load-balancing the traffic flow along the multiple paths.

4. The method of claim 1, further comprising:

interpreting the one of the label switched path values based on a byte format, wherein the one of the label switched path values is represented in a byte having a zero bit position to a seventh bit position, and a one in any of the zero through seventh bit positions indicates a path such that a one in the zero bit position indicates an optimal path, a one in a second bit position represents a second best optimal path, a one in a third bit position represents a third best optimal path, a one in a fourth bit position indicates a fourth best optimal path, a one in a fifth bit position indicates a fifth best optimal path, a one in a sixth bit position indicates a sixth best optimal path, and a one in seventh bit position indicates a seventh best optimal path.

5. The method of claim 1, further comprising:

storing a label forwarding information base;

determining whether congestion exits;

using the extended label forwarding information base to route the traffic flow in response to determining that congestion exists; and using the label forwarding information base to route the traffic flow in response to determining that congestion does not exist.

6. The method of claim 1, further comprising:

operating, by the network device, in a liberal label retention mode that includes storing all labels received and learning a topology of a label-based network based on all of the labels stored, and wherein the one of the label switched path values indicates an order of selection of multiple paths.

7. The method of claim 1, wherein the network device includes a provider edge device of a Multiprotocol Label Switching-based Virtual Private Network, the method further comprising:

adding, to the traffic flow, one or more labels associated with the one of label switched path values.

8. A network device comprising:

line interfaces;

a memory to store an extended label forwarding information base that includes a label forwarding information base and label switched path values, wherein the label forwarding information base indicates paths to which traffic can be routed towards destinations, wherein the paths include optimal and sub-optimal paths based on a shortest path metric, and the label switched path values indicate a selection of one or more paths included in the label forwarding information base, which are mapped to each of the label switch path values, to route the traffic; and a controller configured to:

receive a traffic flow;

select a next hop and one of the label switched path values associated with the next hop;

identify one or more paths to route the traffic flow in accordance with one or more paths indicated by the one of the label switched path values; and transmit the traffic flow along the one or more paths toward a destination.

9. The network device of claim 8, wherein the one of the label switched path values indicates at least one sub-optimal path.

10. The network device of claim 8, wherein the one of the label switched path values indicates multiple paths including at least one sub-optimal path, and the network device further comprises:

a load balancer to load-balance the traffic flow along the multiple paths.

11. The network device of claim 8, wherein the controller is further configured to:

interpret the one of the label switched path values based on a byte format, wherein the one of the label switched path values is represented in a byte having a zero bit position to a seventh bit position, and a one in any of the zero through seventh bit positions indicates a path such that a one in the zero bit position indicates an optimal path, a one in a second bit position represents a second best optimal path, a one in a third bit position represents a third best optimal path, a one in a fourth bit position indicates a fourth best optimal path, a one in a fifth bit position indicates a fifth best optimal path, a one in a sixth bit position indicates a sixth best optimal path, and a one in seventh bit position indicates a seventh best optimal path.

12. The network device of claim 8, wherein the memory stores a label forwarding information base, and the controller is further configured to:

determine whether congestion exits;

use the extended label forwarding information base to route the traffic flow in response to a determination that congestion exists; and use the label forwarding information base to route the traffic flow in response to a determination that congestion does not exist.

13. The network device of claim 8, wherein the controller is further configured to:

operate in a liberal label retention mode that includes storing all labels received and learning a topology of a label-based network based on all of the labels stored, and wherein the one of the label switched path values indicates an order of selection of multiple paths.

14. The network device of claim 8, wherein the controller is further configured to:

add, to the traffic flow, one or more labels associated with the one of label switched path values.

15. The network device of claim 8, wherein the network device is a provider edge router of a Multiprotocol Label Switching-based Virtual Private Network.

16. A method comprising:
  storing, by a network device, an extended forwarding information base that includes a forwarding information base and path values, wherein the forwarding information base indicates paths to route traffic towards destinations, wherein the paths include optimal and sub-optimal paths based on a path metric, and the path values indicate a selection of one or more paths included in the forwarding information base, which are mapped to each of the path values, to route the traffic;
  receiving, by the network device, a traffic flow;
  inspecting, by the network device, the traffic flow;
  selecting, by the network device, a next hop and one of the path values associated with the next hop based on the inspecting;
  identifying, by the network device, one or more paths to route the traffic flow in accordance with one or more paths indicated by the one of the path values; and
  transmitting, by the network device, the traffic flow along the one or more paths toward a destination.

17. The method of claim 16, wherein the network device is of one of a Provider Backbone Bridge Traffic Engineering (PBB-TE)-based network, a Generalized MPLS (GMPLS)-based network, or a Q-in-Q-based network, and wherein the one of the path values indicates multiple paths including at least one sub-optimal path, and the method further comprising:
  load-balancing the traffic flow along the multiple paths.

18. The method of claim 16, further comprising:
  interpreting the one of the path values based on a byte format, wherein the one of the path values is represented in a byte having a zero bit position to a seventh bit position, and a one in the zero bit position indicates an optimal path, a one in a second bit position represents a second best optimal path, a one in a third bit position represents a third best optimal path, a one in a fourth bit position indicates a fourth best optimal path, a one in a fifth bit position indicates a fifth best optimal path, a one in a sixth bit position indicates a sixth best optimal path, and a one in seventh bit position indicates a seventh best optimal path, wherein the path metric includes a shortest path metric.

19. The method of claim 16, further comprising:
  determining whether congestion exits; and
  using the extended forwarding information base to route the traffic flow in response to determining that congestion exists.

20. The method of claim 19, wherein the one of the label switched path values indicates an order of selection of multiple paths and wherein the traffic flow includes virtual private network traffic.

* * * * *